United States Patent [19]

Patel et al.

[11] 4,090,997

[45] May 23, 1978

[54] HIGH-STRENGTH ANAEROBIC SEALANT COMPOSITION AND METHOD OF PREPARATION

[75] Inventors: Purshottam S. Patel, Elk Grove Village; Donald J. McDowell, Riverside, both of Ill.

[73] Assignee: Felt Products Mfg. Co., Skokie, Ill.

[21] Appl. No.: 664,391

[22] Filed: Mar. 5, 1976

[51] Int. Cl.$^2$ .................... C09J 5/00; C08F 2/02
[52] U.S. Cl. .................... 260/47 UA; 156/327
[58] Field of Search .................. 260/47 UA; 526/218, 526/219, 173, 180, 205

[56] References Cited

U.S. PATENT DOCUMENTS

| | | | |
|---|---|---|---|
| 2,558,139 | 8/1947 | Knock | 526/217 |
| 3,218,305 | 11/1965 | Krieble | 156/332 |
| 3,625,930 | 12/1971 | Tobock | 260/47 UA |
| 3,682,875 | 8/1972 | O'Sullivan et al. | 526/47 |
| 3,933,748 | 1/1976 | Matsuda et al. | 526/217 |
| 3,957,561 | 5/1976 | Skoultchi | 260/47 UA |

OTHER PUBLICATIONS

C.A., vol. 82, 1975, entry 59042m.

*Primary Examiner*—Joseph L. Schofer
*Assistant Examiner*—Peter F. Kulkosky
*Attorney, Agent, or Firm*—Dressler, Goldsmith, Clement, Gordon & Shore, Ltd.

[57] ABSTRACT

An anaerobic sealant composition capable of polymerizing upon exclusion of air comprises (1) a polyacrylic ester monomer, (2) an inorganic salt initiator which can be a persulfate or a perchlorate of ammonium, alkali metal or an alkaline earth metal, (3) a polymerization accelerator which can be a secondary or tertiary amine, a N,N-di(lower alkyl)amide of a monocarboxylic aliphatic acid, an organic carboximide of a polycarboxylic acid, or an organic sulfimide of a carboxylic acid, or mixtures of the foregoing (4) a N-nitrosoamine, and (5) a quinone-type polymerization inhibitor. The composition is prepared by compounding the aforementioned ingredients and suitably aging the resulting formulation.

27 Claims, No Drawings

HIGH-STRENGTH ANAEROBIC SEALANT COMPOSITION AND METHOD OF PREPARATION

BACKGROUND OF THE INVENTION

This invention relates to a liquid monomeric composition which has anaerobic curing characteristics, that is, a composition which undergoes spontaneous polymerization to a solid state in the absence of air or substantial amounts of oxygen.

Sealant compositions of this general type have been formulated for bonding closely facing metal surfaces such as threaded joints, for joining nuts to bolts without lock washers, gears to shafts for rotation therewith, and the like. Such compositions are precatalyzed or prereacted monomeric compositions which polymerize in the absence of oxygen but the curing of which is inhibited by oxygen. While such compositions are stored in partially empty containers or air-permeable plastic containers, sufficient amounts of oxygen continuously contact the anaerobic composition to maintain the composition in an uncured, liquid state. However, when an anaerobic composition of this general type is placed between surfaces to be bonded or sealed and atmospheric oxygen, i.e., air, is effectively excluded, polymerization or cure of the composition commences within a relatively short time period and the composition will set to a solid state. The polymerization in the absence of air is accelerated by contact with active metals.

Anaerobic compositions generally are composed of polymerizable acrylic ester monomers and peroxide, hydroperoxide, and other similar polymerization initiators therefor together with amine, amide or imide latent polymerization accelerators which do not initiate polymerization but only accelerate the polymerization reaction once it has begun. In order to prevent premature polymerization of the monomer it has been common practice to incorporate within the anaerobic compositions a small amount of a quinone-type stabilizer which inhibits free radical polymerization. Illustrative prior art anaerobic compositions are disclosed in U.S. Pat. Nos. 2,895,950; 3,041,322; 3,043,820; 3,046,262; 3,203,941; 3,218,305; 3,300,547; 3,720,656 and others.

Some of the anaerobic compositions heretofore known cannot be used on passivated metal surfaces such as stainless steel, cadmium-coated steel, zinc-coated steel, and the like, while other such compositions, which are suitable for use with such surfaces, tend to promote corrosion when used on ordinary steel surfaces. The formulation of the present invention, on the other hand, can be used with stainless steel and other passive metal surfaces as well as with ordinary steel to provide a high-strength bond and without promoting corrosion.

SUMMARY OF THE INVENTION

The present invention contemplates a high-strength anaerobic composition which utilizes certain inorganic salts as polymerization initiators for a polymerizable polyacrylic ester monomer in combination with a N-nitrosoamine modifier and with a polymerization accelerator which can be a secondary or tertiary amine, a N,N-di(lower alkyl) amide of a monocarboxylic aliphatic acid, an organic carboximide of a polycarboxylic acid, an organic sulfimide of a carboxylic acid, or admixtures of the foregoing. Additionally, a quinone-type polymerization inhibitor is present in the composition in an amount sufficient to retard polymerization of the aforesaid monomer during storage of the composition in the presence of air.

DESCRIPTION OF THE PREFERRED EMBODIMENTS

The polyacrylic ester monomers suitable for use in compounding the present anaerobic sealant compositions can be represented by the general formula

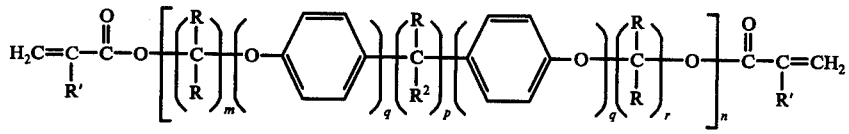

wherein R is a member of the group consisting of hydrogen, alkyl containing 1 to 4 carbon atoms, inclusive, hydroxyalkyl containing 1 to 4 carbon atoms, inclusive, and

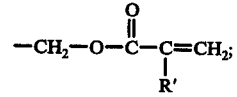

R' is a member of the group consisting of hydrogen, halogen, and alkyl containing 1 to 4 carbon atoms, inclusive; $R^2$ is a member of the group consisting of hydrogen, alkyl containing 1 to 4 carbon atoms, inclusive, hydroxy, and

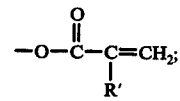

m is an integer having a value of at least 1; n is an integer having a value of at least 1; p is an integer having a value of 0 or 1; q is an integer having a value of 0 or 1; and r is an integer having a value of at least 1.

Typical illustrative monomers within the purview of the foregoing general formula are the ethylene glycol dimethacrylates such as triethylene glycol dimethacrylate, ethylene glycol dimethacrylate, tetraethylene glycol dimethacrylate, polyethylene glycol dimethacrylate, and the like, 1,3-butylene glycol dimethacrylate, trimethylol propane trimethacrylate, neopentyl glycol dimethacrylate, ethoxylated bisphenol A dimethacrylate, propoxylated bisphenol C dimethacrylate, bisphenol A bis(2-hydroxypropyl)dimethacrylate, and the like. For improved heat resistance, particularly in retaining formulations, ethoxylated bisphenol A dimethacrylate is the preferred monomer and can be used alone or in admixtures with other monomers such as tetraethylene glycol dimethacrylate and the like. These monomers need not be in the pure state for the purposes of the present compositions but may comprise commercial grade materials in which polymerization inhibitors or stabilizers such as hydroquinone, benzoquinone, methyl ether hydroquinone, or the like are present.

Moreover, the monomer portion of the present compositions can also contain some free acid such as acrylic acid, methacrylic acid, or the like, so that the acid number of the monomeric constituent is greater than zero. Preferably the acid number of the monomeric constituent in the sealant compositions of this invention is about 0.005 to about 0.05.

The inorganic salt initiator must be present in the anaerobic sealant composition in an amount sufficient to initiate polymerization of the monomer between two surfaces to be joined or bonded upon the exclusion of air, i.e., in the absence of a substantial amount of oxygen. The inorganic salt initiators in this invention are the persulfates or perchlorates of ammonium, an alkali metal, or an alkaline earth metal. Illustrative inorganic salt initiators are ammonium persulfate, ammonium perchlorate, sodium persulfate, sodium perchlorate, potassium persulfate, potassium perchlorate, lithium perchlorate, calcium perchlorate, and magnesium perchlorate.

While some of the inorganic salt initiators contemplated herein are only sparingly soluble in the monomer, in compounding the present liquid formulations the initiator can be introduced in a finely-divided or powdered form and in an excess quantity, and the undissolved and/or un-reacted excess subsequently filtered out. Alternatively, the initiator can be first dissolved in the accelerator and then combined with the monomer, or an auxiliary solvent, chemically inert with respect to the formulation components, can be utilized, if desired. Illustrative of such auxiliary solvents are tetrahydrofuran, alcohols, cellosolve acetate, and the like. Auxiliary solvents that can be oxidized to organic peroxides should be avoided because the present initiator or catalyst system is not a peroxide or hydroperoxide system.

The aforementioned inorganic salt initiators are ionic substances and are further characterized by the fact that the non-oxygen component of the anion in each case has an atomic oxidation state of +7 as defined in Mahn, *Textbook of University Chemistry*, pp. 223 et seq., Addison-Wesley Pub. Co. (1965).

The specific amount of inorganic salt initiator utilized in a given anaerobic sealant formulation will vary depending on the particular initiator, monomer, and accelerator or accelerators that are used. Preferably the amount of initiator present in the anaerobic sealant formulations of this invention can be about 0.005 to about 15 parts by weight per 100 parts by weight of the monomer. The amount of initiator used includes the amount of initiator present as such in the final product plus any amount of initiator that may have entered into chemical reaction with other components present. Analysis of the prepared anaerobic compositions for the cation element of the initiator indicate that the cation element is usually present in a less than stoichoimetric amount relative to the non-oxygen element of the anion. In compounding the present formulations it is preferable to initially add an excess of the inorganic salt initiator and subsequently remove any undissolved solids after the formulation has been aged. During compounding the inorganic salt initiator can be added to the formulation in an amount of up to about 20 parts by weight per 100 parts by weight of the monomer, preferably about 1 to about 20 parts by weight per 100 parts by weight of the monomer.

The modifier contemplated by the present invention is a N-nitrosoamine. These compounds are commercially available and can be represented by the general formula

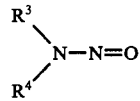

wherein $R^3$ and $R^4$ can be alike or different, and individually can be alkyl containing up to about 8 carbon atoms, aryl, alkaryl and aralkyl containing 6 to about 18 carbon atoms, and together can also form a bivalent hydrocarbon chain of 2 to 12 carbon atoms which, together with the associated nitrogen atom, forms a heterocyclic ring. This hydrocarbon chain can be a cycloaliphatic chain (e.g., cycloalkenylene or cycloalkylene) with or without associated adjacent fused ring structure which shares carbon atoms with the cycloaliphatic chain.

Illustrative of the N-nitrosoamines contemplated by the present invention are the dialkyl-substituted amines, e.g., N-nitrosodipropylamine, N-nitroso-N-ethyl-N-methylamine, N-nitroso-N-butyl-N-methylamine, N-nitroso-N-butyl-N-propylamine, N-nitrosodibutylamine, N-nitrosodioctylamine, and the like, the aromatic amines, e.g., N-nitrosodiphenyl amine, N-nitroso-N-phenyl-N-benzylamine, N-nitroso-N-methylaniline, N-nitroso-N-phenyl-N-tolyamine, N-nitrosodibenzylamine, and the like, as well as the heterocyclic amines, e.g., N-nitrosopiperidine, N-nitrosoaziridine, N-nitrosoazetidine, N-nitrosopyrrolidine, N-nitrosohexamethyleneimine, N-nitrosopyrazole, N-nitrosoimidazole, N-nitrosoindole, N-nitrosocarbazole, and the like.

The N-nitrosoamine modifier can be present in the formulation in an amount of about 0.1 to about 1 part by weight per 100 parts of the monomer, preferably about 0.2 to about 0.9 parts by weight, and most preferably about 0.3 to about 0.6 parts by weight. In general, the more viscous the sealant formulation the more of the modifier should be present.

The preferred polymerization accelerators to be used in conjunction with the foregoing inorganic salt initiators can be a tertiary amine, a N,N-di(lower alkyl)amide of a monocarboxylic aliphatic acid, an organic carboximide of a polycarboxylic acid, an organic sulfimide of a carboxylic acid, or combinations thereof, present in an amount sufficient to accelerate polymerization of the monomer in the absence of air.

Illustrative tertiary amines are alkyl, aryl and/or aralkyl-substituted amines. Typical of the trialkylamines are triethylamine, tripropylamine, tributylamine, and the like. Particularly desirable are the N,N-dialkyl aryl amines of the general formula

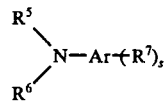

wherein $R^5$ and $R^6$ are hydrocarbyl groups containing up to about 10 carbon atoms, preferably lower alkyl containing up to 4 carbon atoms, and wherein Ar represents an aromatic nucleus which can be phenyl or naphthyl. $R^7$ is a hydrocarbyl group containing up to 5 carbon atoms, preferably lower alkyl or alkoxy containing up to 4 carbon atoms, and $s$ is an integer having a value of 0 to 5, inclusive, with the proviso that when $R^7$ is in the ortho position on the aromatic nucleus $s$ has a value greater than 1. The preferred N,N-dialkyl aryl amine accelerator is N,N-dimethyl-p-toluidine, N,N-diethyl-p-toluidine, N,N-dimethyl-o-toluidine, and the like.

The tertiary amine-type accelerator can be present in the formulation in an amount of about 0.1 to about 2 parts by weight per 100 parts by weight of the monomer, and preferably in an amount of about 0.3 to about 0.7 parts by weight per 100 parts by weight of the monomer.

Illustrative N,N-di(lower alkyl)carboxamides are N,N-dimethyl formamide, N,N-diethyl formamide, N,N-dibutylformamide, N,N-dimethyl acetamide, N,N-diethyl propionamide, and the like.

The amide-type accelerator can be present in the formulation in an amount of about 0.5 to about 40 parts by weight per 100 parts of the monomer, and preferably in an amount of about 5 to about 20 parts by weight per 100 parts by weight of the monomer. In general, the greater the amount of amide-type accelerator present in the sealant composition, the faster the rate of set; however, the ultimate break-away strength is decreased.

Illustrative organic carboximides of a polycarboxylic acid are those having the general formula

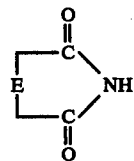

wherein E represents an aromatic or an aliphatic chain nucleus derived from a polycarboxylic acid. Illustrative carboximide accelerators are succinimide, maleimide, malonimide, glutarimide, cyclohexyldicarboximide, phthalimide, 1,2,4-benzenetricarboximide, naphthalimide, the metal salts thereof, and the like.

The carboximide-type accelerator can be present in the formulation in an amount of about 0.25 to about 2 parts by weight per 100 parts by weight of the monomer, and preferably in an amount of about 0.5 to about 2 parts by weight per 100 parts by weight of the monomer.

Illustrative organic sulfimides of a polycarboxylic acid are represented by the general formula

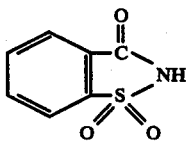

Illustrative sulfimides are benzoic sulfimide, sodium salt of benzoic sulfimide, and the like.

The sulfimide-type accelerator can be present in the formulation in an amount of about 0.25 to about 2 parts by weight per 100 parts by weight of the monomer, and preferably about 0.5 to about 2 parts by weight per 100 parts by weight of the monomer.

A preferred accelerator is a combination of a N,N-dialkyl aryl amine with a sulfimide-type accelerator, in particular, a combination of benzoic sulfimide with N,N-dimethyl-p-toluidine. If desired, an amide-type accelerator such as N,N-dimethyl formamide can also be combined therewith in order to provide sealant grades of varying ultimate strength. The preferred relative amounts of the individual components in the foregoing accelerator combination, expressed as parts by weight per 100 parts of the monomer, are as follows: benzoic sulfimide about 0.5 to about 2 parts by weight N,N-dimethyl-p-toluidine about 0.3 to about 0.7 parts by weight N,N-dimethylformamide 0 to about 10 parts by weight.

As pointed out hereinabove, a small amount of stabilizer, such as a quinone-type stabilizer usually is present in the commercial grades of the polyacrylic ester monomers suitable for the present sealant compositions. However, the present sealant compositions must contain a sufficient amount of a suitable stabilizer to retard polymerization of the monomer during storage of the sealant composition in the presence of air, thus sometimes the amount of stabilizer present in the commercial monomer compositions is supplemented. By the term "quinone-type stabilizer" as used herein and in the claims is meant quinone and its derivatives such as the benzoquinones, the naphthoquinones, the hydroquinones, and the like. Illustrative quinone-type stabilizers are 1,4-benzoquinone, 2,5-dihydroxy benzoquinone, 2,5-diphenyl-p-benzoquinone, 1,2-naphthoquinone, 9,10-anthraquinone, methyl ether hydroquinone, tetrachloro-p-benzoquinone, 2,3-dichloro-1,4-naphthaquinone, and the like.

The amount of quinone-type stabilizer in the present anaerobic sealant compositions can vary depending on the nature of the accelerator that is used. In general, the greater the activity of the accelerator, the more stabilizer should be present in the formulation. When a quinone-type stabilizer is present, it is usually present in an amount of about 50 to about 200 parts by weight per one million parts by weight of the monomer (p.p.m.), or more. Preferably about 75 p.p.m. to about 150 p.p.m. of the hydroquinone or methyl ether hydroquinone types are present.

For optimum performance of the anaerobic sealant compositions, the weight ratio of the accelerator to the initiator in any given instance is also a factor. The overall accelerator-to-initiator weight ratio can be about 8400:1 to about 1:150 respectively. Where the accelerator is a tertiary amine, the accelerator-to-initiator weight ratio can be about 400:1 to about 1:60. Where the accelerator is a N,N-di(lower alkyl) carboxamide, the accelerator-to-initiator weight ratio can be about 8000:1 to about 1:30, respectively. In instances where the accelerator is a sulfonimide or a carboximide the accelerator-to-initiator weight ratio can be about 400:1 to about 1:60, respectively. However, where a mixture of a N,N-dialkyl arylamine and a sulfonimide is used as the accelerator, the accelerator-to-initiator ratio can be about 800:1 to about 1:45, respectively. The accelerator-to-modifier weight ratio preferably is about 40:1 to about 1:25.

Commercial grade polyacrylic ester monomers may partially polymerize upon standing and as a result may develop a relatively high gel content. This condition can be detected by dissolving the monomer in anhydrous methanol and noting any haze or precipitate that develops. In instances where such a monomer having a relatively high gel content is used to prepare anaerobic sealant compositions, the relative amounts of accelerator and modifier preferably are adjusted upwardly in order to enhance the shelf life of the produced compositions. In general, the higher the observed gel content in the aforesaid methanol test, the greater should be the amount of the N-nitrosoamine modifier that is present in the composition.

Depending on the intended end use of the sealant compositions, the viscosity thereof can vary. A liquid composition of relatively low viscosity and good surface tension which enhances capillary action is desirable for joining closely fitting surfaces or for sealing preassembled parts by sealant penetration between the mating surfaces. On the other hand, where relatively loosely fitting surfaces are to be joined or void spaces are to be filled, compositions having a relatively high viscosity or having thixotropic properties are preferred. In general, the sealant compositions can have a viscosity in the range of about 10 to about 2000 centipoises as determined at room temperature using a Brookfield viscometer at 5 revolutions per minute and fitted with spindle No. RV #1.

The viscosity characteristics of the sealant composition can be adjusted to the desired value by using a variety of inert thickeners such as fumed or colloidal silica, polymethylmethacrylate, polyacrylic rubber, cellulose acetate butyrate, diallyl phthalate, and the like. Also suitable are reactive thickening agents such as polyvinyl chloride, chlorinated rubber, and the like. In addition, colorants, plasticizers such as dioctyl phthalate, and the like, release agents such as glycerin, and the like, and inert fillers such as nylon floc, tetrafluoroethylene powder, and the like, can also be added.

The anaerobic sealant compositions are compounded by first admixing a predetermined amount of a polymerizable polyacrylate ester monomer and the inorganic salt initiator. Thereafter at least a portion of the accelerator (e.g., benzoic sulfimide) is added, and the resulting admixture is aged until anaerobic properties are developed. Preferably the accelerator added at this stage of compounding is of the type which promotes dissolution of the initiator in the admixture.

Aging of the prepared admixture can be carried out at ambient or room temperature or at an elevated temperature. The necessary aging period depends to some extent on the aging temperature since anaerobic properties are developed in the formulation within a relatively shorter time period at elevated temperatures and usually is about 12 hours to about 20 days depending on the temperature. Aging temperatures up to about 200° F. are suitable. At ambient temperature the compounded formulations preferably are aged for seven to ten days. At elevated temperatures, for example, at about 120° F., the formulations preferably are aged about 1 day. After aging, any solid materials present in the produced anaerobic composition are filtered out or otherwise removed, e.g., by centrifuging and decanting the composition. After aging and undissolved solids removal, the modifier and additional accelerator (e.g., dimethyl-p-toluidine) are added, and the resulting composition is stirred to produce a substantially homogeneous admixture that is ready for use.

The efficacy of the anaerobic sealant composition can be evaluated by several tests.

The shelf life of an anaerobic sealant composition is ascertained by maintaining the composition in a low-density, air-permeable polyethylene bottle at a temperature of 178° ± 2° F. and checking the formulation for onset of polymerization (gelation) at 30-minute intervals. A sealant composition free from gelation after 30 minutes at 178° ± 2° F. will usually have a shelf life under normal storage conditions for at least one year.

An alternate shelf life test comprises storing of the composition in a low-density polyethylene bottle at 120° ± 3° F. for a time period of 10 days and checking for gelation. If no gelation is observed under these storage conditions after 10 days, the composition will usually have a shelf life under normal storage conditions for at least one year.

Set time and ultimate strength for a sealant composition is ascertained by a "finger-tight" test and a locking torque test. These tests are performed by applying a few drops of the sealant composition to the exposed threads of a degreased three-eighths inch unoxidized steel bolt having 24 threads per inch (Unified Fine Thread Series, Class 2 fit) fitted with a degreased three-eighths inch nut (FF-N-836). Both the bolt and the nut are degreased in 1,1,1-trichloroethane. The nut is unscrewed over the wetted threads until the end of the nut is flush with the end of the bolt and then screwed back on until about one-eighth to three-sixteenths inch of the bolt protrudes through the nut. In this manner complete coverage of the engaged metal area by the sealant composition is assured.

A bolt treated in the foregoing manner is then placed head down on a level surface and allowed to stand. From time to time the nut and bolt are checked to ascertain whether or not the sealant has set to a degree where the nut is "finger-tight" on the bolt, i.e., whether the nut still can be manually turned relative to the bolt without the aid of a wrench or a similar tool. The time period necessary to reach a "finger-tight" set is noted and recorded as set time.

About 24 hours after the nut and bolt have reached a finger-tight set the bolt head is clamped in a vise with the bolt shank disposed vertically. A torque wrench is applied to the nut and the torques required to dislodge the nut (breakaway torque) and to turn the nut after dislodging (runaway torque) are determined. Runaway torque is recorded as the average torque necessary to turn the nut at one-quarter, one-half, three-quarters, and one full turn after the nut has been dislodged by application of the breakaway torque.

Commercially preferred anaerobic sealant compositions are those exhibiting a set time to a finger-tight condition of less than about 24 hours, and a value for breakaway torque or runaway torque of 5 inch-pounds or greater.

The static shear strength test for an anaerobic sealant composition is performed by applying the composition to a degreased steel pin, then positioning a collar of the same material over the pin, and permitting the resulting assembly to set for 24 hours at room temperature. Thereafter the assembly is placed on a hollow support cylinder so that the collar rests on the upper end of the cylinder and the lower end of the pin is received within the hollow portion of the cylinder. The hollow support cylinder and the pin-and-collar assembly are then positioned on the moving platten of an Instron tester so that the upper end of the pin abuts the fixed plate of the tester.

To ascertain the static shear strength of the seal obtained between the pin and the collar, the moving platten, carrying the support cylinder and the pin-and-collar assembly are advanced against the fixed plate at a rate of about 0.001 inch/second until the seal fails. The maximum load at failure is recorded, and the static shear strength is computed by dividing the maximum load at breakaway by the bonded area between the pin and the collar.

For the test results reported hereinbelow both the pin and the collar were made out of A.I.S.I. 1018 carbon steel having a finish not exceeding 32 microinches. The pin had an outside diameter of 0.499 ± 0.001 inch, the collar had an inside diameter of 0.50 ± 0.001 inch, and the dimensional clearance between the pin and the collar was 0.002 ± 0.001 inch.

The present invention is further illustrated by the following examples.

EXAMPLE 1

Anaerobic Sealant Composition Containing N-Nitrosodiphenylamine Modifier

A sealant composition was compounded using tetraethylene glycol dimethacrylate monomer (100 parts by weight), hydroquinone (about 100 parts per million parts of monomer), potassium perchlorate (0.55 parts by weight), benzoic sulfimide (0.5 parts by weight), dimethyl-p-toluidine (0.3 parts by weight), and N-nitrosodiphenylamine (0.2 parts by weight). Initially an admixture of the monomer and potassium perchlorate was produced, benzoic sulfimide added, and the admixture then aged at room temperature for about 7 days. The aged admixture was thereafter filtered, dimethyl-p-toluidine and N-nitrosodiphenylamine added thereto, and stirred. The produced composition was tested for set time, and for breakaway torque and runaway torque, using three-eighths inch steel bolts and nuts. Gelling time at 180° F. was also noted.

The set time was found to be about 15 minutes and the gelling time at 180° F. about 5.5 hours. The breakaway torque was found to be 96 inch-pounds and the runaway torque was found to be 282 inch-pounds.

EXAMPLE 2

Investigation of Static Shear Strength of Anaerobic Sealant Compositions Containing N-Nitrosodiphenylamine Anaerobic sealant formulations containing tetraethylene glycol dimethacrylate, potassium perchlorate, and varying amounts of accelerators, diallyl phthalate resin as a thickener, and N-nitrosodiphenylamine as a modifier were compounded, and tested for static shear strength, set time, and shelf life at 120° F. The test results are compiled in Table I, below. All amounts of the components initially introduced in the formulation are expressed as parts by weight. The compositions in each instance were compounded by first admixing the monomer, the initiator, and benzoic sulfimide, aging the admixture, filtering the aged admixture, and thereafter mixing in the remainder of the components to produce a substantially homogeneous composition.

Table I

Properties of Anaerobic Formulations

| Tetraethylene Glycol Dimethacrylate Monomer | Initiator[1] | Co-Accelerators | | Modifier[4] | Thickener[5] | Set Time, hrs:min | Shelf Life at 120° C | Static Shear Strength, psi |
|---|---|---|---|---|---|---|---|---|
| | | BS[2] | DMT[3] | | | | | |
| 100 | 0.55 | 0.5 | 0.36 | 0.24 | 21 | 0:12 | good | 2463 |
| 100 | 0.55 | 0.5 | 0.36 | 0.24 | 40 | 0:25 | good | 1933 |
| 100 | 0.55 | 0.5 | 0.45 | 0.2 | 21 | 0:15 | good | 2808 |
| 100 | 0.55 | 0.5 | 0.3 | 0.1 | 40 | 0:20 | fair | 3742 |

[1]KClO$_4$
[2]BS - benzoic sulfimide
[3]DMT - dimethyl-p-toluidine
[4]N-Nitrosodiphenyl amine
[5]Diallylphthalate resin

EXAMPLE 3

Activity of N-Nitrosoamine-Containing Formulations on Passive Surfaces

An anaerobic sealant formulation was prepared by admixing tetraethylene glycol dimethacrylate monomer (100 parts by weight; containing about 90 p.p.m. hydroquinone), potassium perchlorate (0.55 parts by weight), benzoic sulfimide (0.5 parts by weight), dimethyl-p-toluidine (0.36 parts by weight), N-nitrosodiphenyl amine (0.24 parts by weight), and diallyl phthalate resin (40 parts by weight) in the same manner as in Example 2. The resulting formulation was tested on three-eighths inch-24 bolts and nuts made of steel, zinc-coated steel, and stainless steel. The test results are compiled in Table II, below.

Table II

| | Activity of Formulation on Passive Surfaces | | |
|---|---|---|---|
| | Set Time, | Torque, in-lbs | |
| Surface | hrs:min | Breakaway | Runaway |
| steel | 0.25 | 144 | 466 |
| zinc | 0:15 | 108 | 141 |
| stainless steel | 0:30 | 80 | 248 |

As can be seen from the foregoing test results, the present anaerobic sealant formulation is active on stainless steel and zinc surfaces as well as on steel surfaces. In addition, no corrosion of the steel surface was observed on the steel surface after storage for 30 days at ambient conditions.

EXAMPLE 4

Anaerobic Sealant Compositions Containing Different Initiators and Different Accelerator Combinations Anaerobic sealant formulations were compounded by admixing tetraethylene glycol dimethacrylate monomer (100 parts by weight; containing about 90 p.p.m. hydroquinone), various initiators, accelerator combinations, and N-nitrosodiphenyl amine in the same manner as set forth in Example 2. The obtained compositions were tested for shelf life at room temperature, at 120° F., and at 180° F. for set time and for torque before and after aging for 10 days at 120° F. on steel and stainless steel three-eighths inch-24 bolts and nuts. The test results are set forth in Table III, below.

Table III

Comparison of Formulation Properties Before and After Aging Using Different Initiators

| Initiator parts/100 parts monomer) | Co-Accelerators BS[2] | Co-Accelerators DMF[6] | Co-Accelerators DMT[3] | N-Nitroso-diphenyl amine | Shelf Life at Temp. R.T. | Shelf Life at Temp. 120° F. | Shelf Life at Temp. 180° F. | Set Time (hrs:min) & torque in in-lbs (breakaway/runaway) Before Aging steel | Set Time (hrs:min) & torque in in-lbs (breakaway/runaway) Before Aging stainless steel | Set Time (hrs:min) & torque in in-lbs (breakaway/runaway) After Aging at 120° F., 10 days steel | Set Time (hrs:min) & torque in in-lbs (breakaway/runaway) After Aging at 120° F., 10 days stainless steel |
|---|---|---|---|---|---|---|---|---|---|---|---|
| NH$_4$ClO$_4$ (5.6)[7] | 0.5 | — | 0.3 | 0.2 | <1 day | <0.5 hr | <0.5 hr | 0:30 120/462 | 0:30 36/222 | — | — |
| KClO$_4$ (0.55) | 0.5 | — | 0.3 | 0.2 | >1 mo. | >10 days | 5 hrs | 0:25 84/370 | 0:30 60/230 | 0:55 108/295 | 1:00 48/208 |
| NaClO$_4$ (5) | 0.5 | — | 0.3 | 0.2 | <1 day | >10 days | 3 hrs | 0:20 90/468+ | 0:20 3/213 | no set | no set |
| (NH$_4$)$_2$S$_2$O$_8$ (10)[7] | 0.5 | — | 0.3 | 0.2 | >1 mo. | >10 days | 3 hrs | 0:30 96/417 | 0:30 36/273 | 0:45 108/414 | 0:50 48/165 |
| (NH$_4$)$_2$S$_2$O$_8$ (10)[7] | 0.5 | 5 | 0.3 | 0.2 | <1 day | 4 days | 3 hrs | 0:30 70/249 | 0:30 36/117 | — | — |
| K$_2$S$_2$O$_8$ (0.217) | 0.5 | — | 0.3 | 0.2 | >1 mo. | >10 days | 3 hrs | 0:25 60/228 | 0:25 36/237 | 0:45 96/138 | 2:00 36/51 |
| K$_2$S$_2$O$_8$ (0.217) | 0.5 | 5 | 0.3 | 0.2 | >1 mo. | 5 days | 3 hrs | 0:25 72/189 | 0:30 24/141 | — | — |
| Na$_2$S$_2$O$_8$ (0.52) | 0.5 | — | 0.3 | 0.2 | >1 mo. | >10 days | 4 hrs | 1:00 72/369 | 1:30 36/204 | 1:30 72/360 | 2:00 48/150 |
| Na$_2$S$_2$O$_8$ (0.52) | 0.5 | 5 | 0.3 | 0.2 | >1 mo. | >10 days | 4 hrs | 0:50 72/165 | 1:30 36/150 | 0:55 60/192 | 1:30 48/153 |

[2]benzoic sulfimide;
[3]dimethyl-p-toluidine;
[6]dimethyl formamide;
[7]amount added during compounding but all of which did not dissolve From the data shown in Table III it can be readily seen that the various perchlorates as well as persulfates are effective initiators for the present anaerobic system.

EXAMPLE 5

Anaerobic Systems Compounded with Various Monomers

Anaerobic sealant formulations were prepared in the same manner as set forth in Example 2 utilizing various dimethacrylate monomers (100 parts by weight; containing about 90 p.p.m. hydroquinone), varying amounts of potassium perchlorate initiator, benzoic sulfimide (0.5 parts by weight), dimethyl-p-toluidine (0.3 parts by weight), and N-nitrosodiphenyl amine (0.2 parts by weight). The obtained formulations were tested for shelf life and for set time and strength on three-eighths inch-24 steel and stainless steel bolts and nuts. The test results are presented in Table IV, below.

Table IV

Anaerobic Systems With Various Monomers

| Monomer | KClO$_4$, Parts by wt. | Shelf Life at 120° F. | Set Time (hrs:min) and Torque in in-lbs (breakaway/runaway) steel | Set Time (hrs:min) and Torque in in-lbs (breakaway/runaway) stainless steel |
|---|---|---|---|---|
| ethylene glycol dimethacrylate | 0.108 | 1 day | 1:00 36/303 | 1:10 84/117 |
| 1,3-butylene glycol dimethacrylate | 0.156 | 3 days | 0:25 36/255 | 0:45 84/195 |
| ethoxylated bisphenol A | | | 0:40 | 1:00 |
| dimethacrylate | 5.6[7] | >10 days | 60/222 | 108/162 |

[7]amount added during compounding but all of which did not dissolve

The foregoing data indicate that good set time and strength characteristics can be obtained with various dimethacrylate monomers on both steel and stainless steel surfaces.

EXAMPLE 6

Anaerobic Systems Compounded with Various N-Nitroso Amines

Anaerobic sealant formulations were compounded in the same manner as set forth in Example 2 using tetraethylene glycol dimethacrylate (100 parts by weight), potassium perchlorate (0.55 parts by weight), benzoic sulfimide (0.5 parts by weight), dimethyl-p-toluidine (0.36 parts by weight), and 0.4 parts by weight of an organic compound having a nitroso group on the nucleus thereof. The resulting formulations were tested for shelf life at 180° F. and at 120° F., and the set time and strength on three-eighths inch-24 steel and stainless steel nuts and bolts determined. The obtained data are presented in Table V, below.

Table V

Activity of Nitroso Compounds in Anaerobic Sealants

| Nitroso Compound | Shelf Life 120° F. | Shelf Life R.T. | steel Set Time (hrs:min) | steel Torque, in-lbs (breakaway/runaway) | stainless steel Set Time (hrs:min) | stainless steel Torque, in-lbs breakaway/runaway |
|---|---|---|---|---|---|---|
| N-Nitrosodiphenyl amine | >10 days | >38 days | 0:30 | 84/273 | 0:30 | 72/262 |
| p-Nitrosodiphenyl amine | >10 days | >38 days | no set | — | no set | — |
| N,N-Dimethyl-p-nitroso aniline | >10 days | >38 days | no set | — | 24–74 hrs | 12/8 |
| N-Nitroso-N-phenylbenzyl amine | 1 hr | 2 hrs | 0:45 | 120/375 | 0:45 | 36/222 |
| N-Nitrosopiperidine | 1 hr | 1 hr | 1:00 | 120/474 | 1:00 | 48/231 |
| N-Nitrodipropyl amine | 4 hrs | 3 days | 0:40 | 72/348 | 0:40 | 48/288 |
| N-Nitrosocarbazole | >4 days | — | 0:35 | 72/249 | 0:35 | 36/255 |
| 6-Nitrosothymol | >4 days | — | no set | — | no set | — |

The data in Table V illustrate that the presence of the >N—N=O structure in the modifier compound is necessary to obtain the desired high strength properties for the sealant formulation.

Typical other anaerobic sealant compositions that can be compounded are as follows:

| Formulation I | Parts by Weight |
|---|---|
| tetraethylene glycol dimethacrylate | 100 |
| potassium perchlorate | 0.55 |
| benzoic sulfimide | 0.5 |
| N-nitrosodiphenylamine | 0.6 |
| dimethyl-p-toluidine | 0.6 |
| colorant | 0.009 |
| dioctyl phthalate | 8 |
| Formulation II | Parts by Weight |
| tetraethylene glycol dimethacrylate | 100 |
| potassium perchlorate | 0.55 |
| benzoic sulfimide | 0.5 |
| N-nitrosodiphenylamine | 0.4 |
| dimethyl-p-toluidine | 0.36 |
| diallyl phthalate resin | 27 |
| colorant | 0.008 |
| dioctyl phthalate | 36 |
| Formulation III | Parts by Weight |
| tetraethylene glycol dimethacrylate | 100 |
| potassium perchlorate | 0.55 |
| benzoic sulfimide | 0.5 |
| N-nitrosodiphenylamine | 0.9 |
| dimethyl-p-toluidine | 0.6 |
| titanium dioxide | 16 |
| tetrafluoroethylene powder | 30 |
| polyester plasticizer | 120 |
| fumed silica | 6 |
| Formulation IV | Parts by Weight |
| tetraethylene glycol dimethacrylate | 100 |
| ethoxylated bisphenol A dimethacrylate | 75 |
| potassium perchlorate | 0.55 |
| benzoic sulfimide | 1.0 |
| N-nitrosodiphenylamine | 0.3 |
| dimethyl-p-toluidine | 0.8 |
| colorant | 0.02 |
| diallyl phthalate resin | 30 |

The foregoing description and the examples are intended as illustrative and are not to be taken as limiting. Still other variations within the spirit and scope of the invention are possible and will readily present themselves to one skilled in the art.

We claim:

1. A relatively high-strength anaerobic sealant composition having an extended shelf life in the presence of air and capable of polymerization upon exclusion of air which comprises a polyacrylic ester monomer represented by the general formula

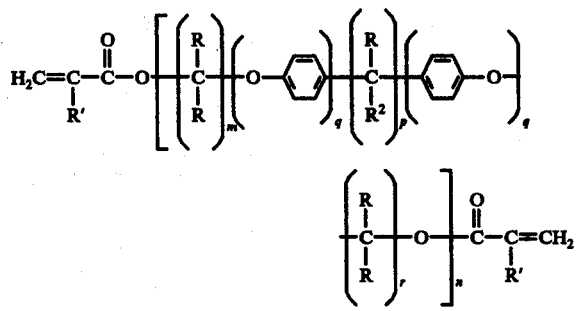

wherein R is a member of the group consisting of hydrogen, alkyl containing 1 to 4 carbon atoms, inclusive, hydroxyalkyl containing 1 to 4 carbon atoms, inclusive, and

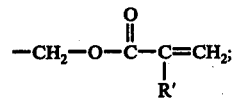

R' is a member of the group consisting of hydrogen, halogen, and alkyl containing 1 to 4 carbon atoms, inclusive; $R^2$ is a member of the group consisting of hydrogen, alkyl containing 1 to 4 carbon atoms, inclusive, hydroxy, and

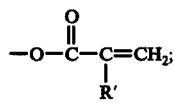

m is an integer having a value of at least 1; n is an integer having a value of at least 1; p is an integer having a value of 0 or 1; q is an integer having a value of 0 or 1; and r is an integer having a value of at least 1;

an inorganic salt initiator which is a member of the group consisting of ammonium perchlorate, alkali metal perchlorate, alkaline earth metal perchlorate, ammonium persulfate, alkali metal persulfate, and alkaline earth metal persulfate, present in an amount sufficient to initiate polymerization of the monomer in the absence of air;

a modifier which is a N-nitroso amine present in an amount of about 0.1 to about 1 part by weight per 100 parts of said monomer;

an accelerator present in an amount sufficient to accelerate polymerization of the monomer in the absence of air; and a quinone-type polymerization inhibitor in an amount sufficient to retard polymerization of the monomer during storage of the composition in the presence of air.

2. The anaerobic sealant composition in accordance with claim 1 wherein the modifier is present in the composition in an amount of about 0.2 to about 0.9 parts by weight per 100 parts by weight of the polyacrylic ester monomer.

3. The anaerobic sealant composition in accordance with claim 1 wherein the modifier is present in the composition in an amount of about 0.3 to about 0.6 parts by weight per 100 parts by weight of the polyacrylic ester monomer.

4. The anaerobic sealant composition in accordance with claim 1 wherein the modifier is a N-nitrosoamine of the general formula

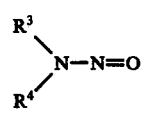

wherein $R^3$ and $R^4$ are members of the group consisting of alkyl containing up to about 8 carbon atoms, aryl, alkaryl, aralkyl containing 6 to about 18 carbon atoms, and a bivalent hydrocarbon chain of 2 to 12 carbon atoms, inclusive.

5. The anaerobic sealant composition in accordance with claim 1 wherein the modifier is a dialkyl-substituted N-nitroso amine.

6. The anaerobic sealant composition in accordance with claim 5 wherein the dialkyl-substituted N-nitroso amine is N-nitrosodipropyl amine.

7. The anaerobic sealant composition in accordance with claim 1 wherein the modifier is an aromatic N-nitroso amine.

8. The anaerobic sealant composition in accordance with claim 7 wherein the aromatic N-nitroso amine is N-nitrosodiphenyl amine.

9. The anaerobic sealant composition in accordance with claim 7 wherein the aromatic N-nitroso amine is N-nitroso-N-phenylbenzyl amine.

10. The anaerobic sealant composition in accordance with claim 1 wherein the modifier is a heterocyclic N-nitroso amine.

11. The anaerobic sealant composition in accordance with claim 10 wherein the heterocyclic N-nitroso amine is N-nitrosopiperidine.

12. The anaerobic sealant composition in accordance with claim 10 wherein the heterocyclic N-nitroso amine is 9-nitrosocarbazole.

13. The anaerobic sealant composition in accordance with claim 1 wherein the modifier is N-nitrosodiphenyl amine and wherein the accelerator comprises as a major portion by weight benzoic sulfimide and as a minor portion by weight dimethyl-p-toluidine.

14. The anaerobic sealant composition in accordance with claim 1 wherein the modifier is N-nitrosodiphenyl amine and wherein the accelerator comprises a mixture of benzoic sulfimide, dimethyl formamide, and dimethyl-p-toluidine.

15. The anaerobic sealant composition in accordance with claim 1 wherein the monomer is an ethylene glycol dimethacrylate, wherein the initiator is potassium perchlorate, wherein the accelerator is a mixture of benzoic sulfimide and dimethyl-p-toluidine, and wherein the modifier is N-nitrosodiphenyl amine.

16. The anaerobic sealant composition in accordance with claim 15 wherein the ethylene glycol dimethacrylate is tetraethylene glycol dimethacrylate.

17. The anaerobic sealant composition in accordance with claim 1 wherein the monomer is 1,3-butylene glycol dimethacrylate, wherein the initiator is potassium perchlorate, wherein the accelerator is a mixture of benzoic sulfimide and dimethyl-p-toluidine and wherein the modifier is N-nitrosodiphenyl amine.

18. The anaerobic sealant composition in accordance with claim 1 wherein the monomer is ethoxylated bisphenol A dimethacrylate, wherein the initiator is potassium perchlorate, wherein the accelerator is a mixture of benzoic sulfimide and dimethyl-p-toluidine, and wherein the modifier is N-nitrosodiphenyl amine.

19. The anaerobic sealant composition in accordance with claim 1 wherein the monomer is an admixture of tetraethylene glycol dimethacrylate and ethoxylated bisphenol A dimethacrylate, wherein the initiator is potassium perchlorate, wherein the accelerator is a mixture of benzoic sulfimide and dimethyl-p-toluidine, and wherein the modifier is N-nitrosodiphenyl amine.

20. The anaerobic sealant composition in accordance with claim 1 wherein the monomer is tetraethylene glycol dimethacrylate, wherein the initiator is potassium perchlorate in an amount of about 0.005 to about 15 parts by weight per 100 parts by weight of the monomer, wherein the accelerator is benzoic sulfimide in an amount of about 0.5 to about 2 parts by weight per 100 parts by weight of the monomer and N,N-dimethyl-p-toluidine in an amount of about 0.3 to about 0.7 parts by weight per 100 parts by weight of the monomer, and wherein the modifier is N-nitrosodiphenyl amine in an amount of about 0.2 to about 0.9 parts by weight per 100 parts by weight of the monomer.

21. The anaerobic sealant composition in accordance with claim 1 wherein the monomer is a mixture of tetraethylene glycol dimethacrylate and ethoxylated bisphenol A dimethacrylate, wherein the initiator is potassium perchlorate in an amount of about 0.005 to about 15 parts by weight per 100 parts by weight of the monomer, wherein the accelerator is benzoic sulfimide in an amount of about 0.5 to about 2 parts by weight per 100 parts by weight of the monomer and N,N-dimethyl-p-toluidine in an amount of about 0.3 to about 0.7 parts by weight per 100 parts by weight of the monomer, and wherein the modifier is N-nitrosodiphenyl amine in an amount of about 0.2 to about 0.9 parts by weight per 100 parts by weight of the monomer.

22. A method for preparing an anaerobic sealant composition which includes a polymerizable polyacrylic ester monomer, an inorganic salt initiator, a polymerization accelerator, and a N-nitroso amine modifier which method comprises the steps of
- forming an admixture of the polyacrylic ester monomer with the inorganic salt initiator and with at least a portion of the accelerator;
- aging the formed admixture for a time period sufficient to develop anaerobic properties in the admixture;
- removing undissolved solids from the aged admixture if said solids are present therein;
- adding to the undissolved solids-free, aged admixture the remainder of the accelerator and the N-nitroso amine modifier; and
- stirring the produced mixture to produce a substantially homogeneous anaerobic sealant composition.

23. The method in accordance with claim 22 wherein the aging is carried out for a time period of about 12 hours to about 20 days.

24. The method in accordance with claim 23 wherein the aging is carried out at ambient temperature for about 2 to about 10 days.

25. The method in accordance with claim 23 wherein the aging is carried out at ambient temperature for about 7 days.

26. The method in accordance with claim 23 wherein the aging is carried out at an elevated temperature up to about 200° F.

27. The method in accordance with claim 23 wherein the aging is carried out at a temperature of about 120° F. for about one day.

* * * * *

UNITED STATES PATENT AND TRADEMARK OFFICE
CERTIFICATE OF CORRECTION

PATENT NO. : 4,090,997

DATED : 23 May 1978

INVENTOR(S) : Purshottam S. Patel and Donald J. McDowell

Page 1 of 2

It is certified that error appears in the above-identified patent and that said Letters Patent are hereby corrected as shown below:

Table I, col. 8, "120°C" should be -- 120°F --.

Table II, col. 2, "0.25" should be -- 0:25 --.

Table III should appear in the patent as shown below.

Table III

Comparison of Formulation Properties Before and After Aging Using Different Initiators

| Initiator (parts/100 parts monomer) | Co-Accelerators | | | N-Nitroso-diphenyl amine | Shelf Life at Temp. | | | Set Time (hrs:min) & torque in in-lbs (breakaway/runaway) | | | |
|---|---|---|---|---|---|---|---|---|---|---|---|
| | | | | | | | | Before Aging | | After Aging at 120° F., 10 days | |
| | BS[2] | DMF[6] | DMT[3] | | R.T. | 120° F. | 180° F. | stainless steel | steel | steel | stainless steel |
| NH$_4$ClO$_4$ (5.6)[7] | 0.5 | — | 0.3 | 0.2 | <1 day | <0.5 hr | <0.5 hr | 0:30 120/462 | 0:30 36/222 | — | — |
| KClO$_4$ (0.55) | 0.5 | — | 0.3 | 0.2 | >1 mo. | >10 days | 5 hrs | 0:25 84/370 | 0:30 60/230 | 0:55 108/295 | 1:00 48/208 |
| NaClO$_4$ (5) | 0.5 | — | 0.3 | 0.2 | <1 day | >10 days | 3 hrs | 0:20 90/468+ | 0:20 3/213 | no set | no set |
| (NH$_4$)$_2$S$_2$O$_8$ (10)[7] | 0.5 | — | 0.3 | 0.2 | >1 mo. | >10 days | 3 hrs | 0:30 96/417 | 0:30 36/273 | 0:45 108/414 | 0:50 48/165 |
| (NH$_4$)$_2$S$_2$O$_8$ (10)[7] | 0.5 | 5 | 0.3 | 0.2 | <1 day | 4 days | 3 hrs | 0:30 70/249 | 0:30 36/117 | — | — |
| K$_2$S$_2$O$_8$ (0.217) | 0.5 | — | 0.3 | 0.2 | >1 mo. | >10 days | 3 hrs | 0:25 60/228 | 0:25 36/237 | 0:45 96/138 | 2:00 36/51 |
| K$_2$S$_2$O$_8$ (0.217) | 0.5 | 5 | 0.3 | 0.2 | >1 mo. | 5 days | 3 hrs | 0:25 72/189 | 0:30 24/141 | — | — |
| Na$_2$S$_2$O$_8$ (0.52) | 0.5 | — | 0.3 | 0.2 | >1 mo. | >10 days | 4 hrs | 1:00 72/369 | 1:30 36/204 | 1:30 72/360 | 2:00 48/150 |
| Na$_2$S$_2$O$_8$ (0.52) | 0.5 | 5 | 0.3 | 0.2 | >1 mo. | >10 days | 4 hrs | 0:50 72/165 | 1:30 36/150 | 0:55 60/192 | 1:30 48/153 |

[2] benzoic sulfimide;
[3] dimethyl-p-toluidine;
[6] dimethyl formamide;
[7] amount added during compounding but all of which did not dissolve

UNITED STATES PATENT AND TRADEMARK OFFICE
CERTIFICATE OF CORRECTION

PATENT NO. : 4,090,997

DATED : 23 May 1978

INVENTOR(S) : Purshottam S. Patel and Donald J. McDowell

It is certified that error appears in the above-identified patent and that said Letters Patent are hereby corrected as shown below:

Table V should appear in the patent as shown below.

Table V

| | Activity of Nitroso Compounds in Anaerobic Sealants | | | | | |
| | | | steel | | stainless steel | |
| | Shelf Life | | Set Time | Torque, in-lbs | Set Time | Torque, in-lbs |
| Nitroso Compound | 120° F. | R. T. | (hrs:min) | (breakaway/runaway) | (hrs:min) | (breakaway/runaway) |
|---|---|---|---|---|---|---|
| N-Nitrosodiphenyl amine | >10 days | >38 days | 0:30 | 84/273 | 0:30 | 72/262 |
| p-Nitrosodiphenyl amine | >10 days | >38 days | no set | — | no set | — |
| N,N-Dimethyl-p-nitroso aniline | >10 days | >38 days | no set | — | 24-74 hrs | 12/8 |
| N-Nitroso-N'-phenylbenzyl amine | 1 hr | 2 hrs | 0:45 | 120/375 | 0:45 | 36/222 |
| N-Nitrosopiperidine | 1 hr | 1 hr | 1:00 | 120/474 | 1:00 | 48/231 |
| N-Nitrodipropyl amine | 4 hrs | 3 days | 0:40 | 72/348 | 0:40 | 48/288 |
| N-Nitrosocarbazole | >4 days | — | 0:35 | 72/249 | 0:35 | 36/255 |
| 6-Nitrosothymol | >4 days | — | no set | — | no set | — |

Signed and Sealed this

Twenty-sixth Day of December 1978

[SEAL]

Attest:

RUTH C. MASON
Attesting Officer

DONALD W. BANNER
Commissioner of Patents and Trademarks